March 17, 1953     G. O. ARVIDSON     2,631,618
SAW FEED MECHANISM WITH RESILIENT CUP FEED ROLLS
Filed March 17, 1948
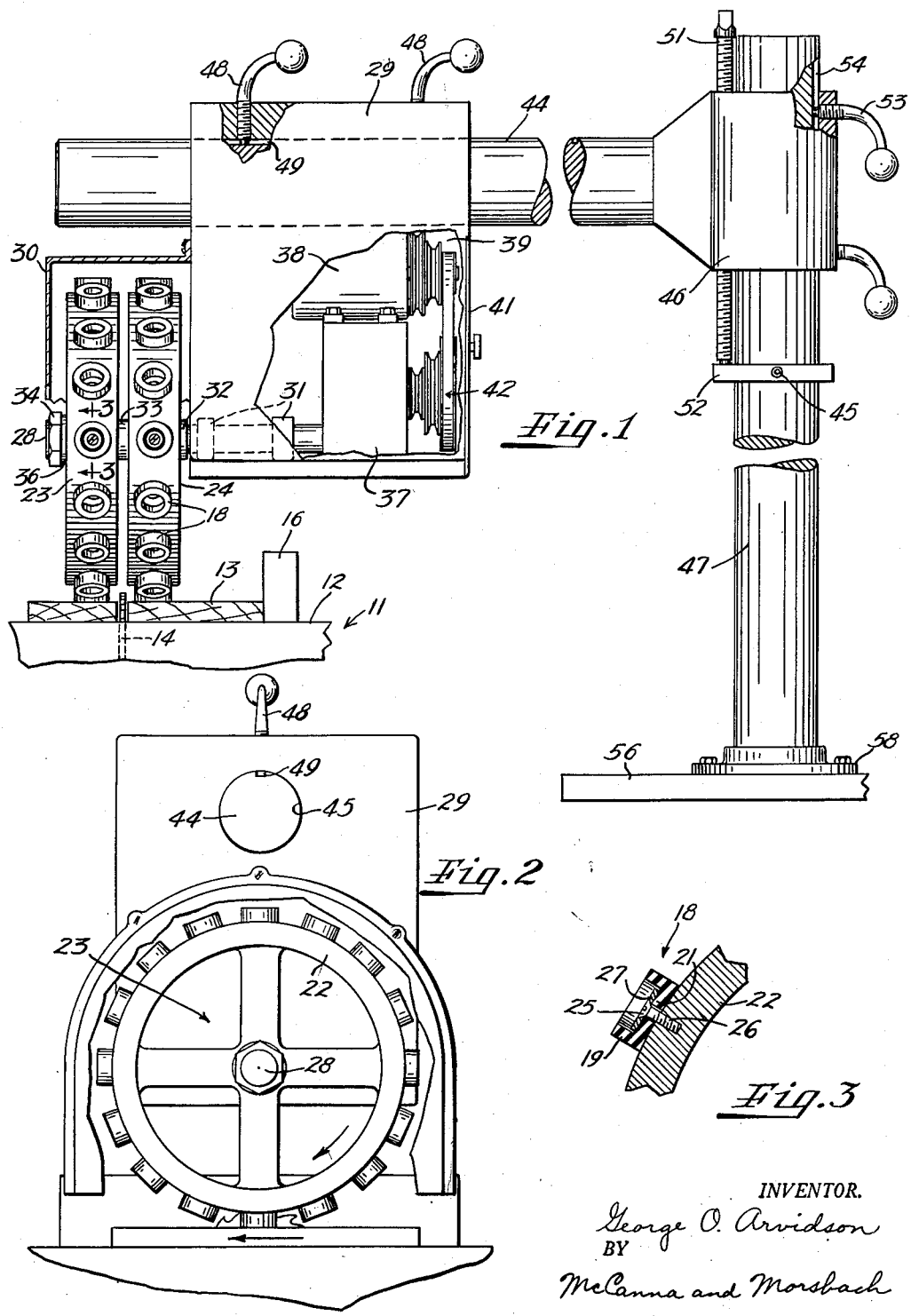
INVENTOR.
George O. Arvidson
BY
McCanna and Morsbach
ATTYS.

Patented Mar. 17, 1953

2,631,618

UNITED STATES PATENT OFFICE 2,631,618

SAW FEED MECHANISM WITH RESILIENT CUP FEED ROLLS

George O. Arvidson, Rockford, Ill.

Application March 17, 1948, Serial No. 15,319

5 Claims. (Cl. 143—55)

This invention relates to a feed mechanism for feeding plywood, panelling, veneer wood and the like having a finished surface formed thereon to a saw.

In the woodworking industry it is frequently necessary to cut a piece of plywood panelling, veneer wood or the like after the latter has been sanded or otherwise finished for varnishing or painting. This is particularly true in the furniture industry where finished panels are sawed in a trim saw after they are sanded to cut them to the desired finished dimensions. Present feed mechanisms cannot be satisfactorily utilized to feed panels and the like having a finished surface formed thereon since means are provided on such mechanisms that engage the panel in a manner that leaves marks on the surface of the panel after the latter has been fed to the saw. Obviously, in a panel having a finished surface formed thereon, indentations, marks and the like caused by a feed mechanism cannot be tolerated. As a result finished panels of the above described character have heretofore been fed to the trim saw by hand. Since many of the panels in the furniture industry are of short pre-cut lengths it is necessary that the operator get his hands in close proximity to the saw blade in trimming the panels to the desired width. Because the operator has had to get his hands close to the saw blade many operators have lost fingers in feeding the work to the trim saw. In general feeding finished panels and the like to the trim saw is considered one of the most hazardous occupations in the furniture industry.

Accordingly, an object of the present invention is to provide a feed mechanism that feeds a finished panel or the like to a trim saw in a manner which does not leave marks, indentations, and the like on the surface thereof.

Another object of the invention is to provide a feed mechanism of the above character which is simple in operation, which requires a minimum of maintenance, which is positive in its feed action so that an operator is not required to use his hands in feeding the work to the saw, which is adjustable so that the speed of feed is adjustable, which may be adjusted for different thicknesses of work and which is relatively inexpensive to manufacture.

Other objects and advantages of the invention will become apparent from the following detailed description taken in connection with the accompanying drawings, in which—

Figure 1 is an elevational view of a trim saw and a feed mechanism embodying the present invention;

Fig. 2 is a fragmentary end view of Figure 1;

Fig. 3 is a fragmentary sectional view taken substantially along the line 3—3 of Figure 1.

Referring now to the drawings the invention is shown embodied in a feed mechanism for a trim saw 11. For purposes of simplifying the drawings only a smooth conventional feed table 12 upon which a panel 13 slides, as it is fed to a rotating saw blade 14 projecting up through the table 12 and a guide or fence 16 in spaced relation with the blade 14 and against which the panel 13 abuts when it is fed to the blade 14 of the saw 11 are shown. It is to be understood that the distance between the guide 16 and the blade 14 is adjustable in a predetermined manner so that different widths of panels, as required, may be cut on the trim saw. Although for purposes of illustration the feed mechanism has been shown as utilized with a trim saw 11, it is to be understood that the feed mechanism may also be used with other types of saws or cutting instruments.

One phase of the invention is concerned with a feed mechanism for feeding panels or the like having a finished surface formed thereon to the blade 14 in a manner which does not leave grip marks, indentations or the like on the surface of the panel. It contemplates utilizing friction means for engaging the top surface of the panel 13 in a manner whereby the panel can be fed across the table 12 to the saw 14 at preselected speeds and mounting the friction means in a manner to provide for adjusting the position thereof relative to the saw blade 14 and the table 12. One embodiment of the invention is shown in Figures 1, 2 and 3. In this embodiment of the invention the friction means comprises a plurality of annularly spaced, radially extending friction members or cups 18 on each side of the blade 14 mounted for rotation about an axis spaced vertically from the blade 14 so that the cups grippingly engage the top surface of the panel 13 on both sides of the blade. As shown in Figs. 1 and 3 the cups 18 are in the form of cylindrical shaped members 19 having a closed end or mounting portion 21. It is to be understood that other shapes may be utilized as desired. While the cups may be formed of any suitable resilient material they are shown herein as being formed from relatively soft resilient rubber. The cups 18 are secured to the rims 22 of spoked wheels 23 and 24, so that the open ends of the cups project radially outwardly from the rims and in effect define annular friction surfaces of substantial area. For this purpose a screw 25 extends through the closed end 21 of each cup 18 and is screwed into a threaded opening 26 formed in the rims 22 of the respective wheels. A washer 27 may be disposed between the head of the screw 25 and the end 21 of the cup 18 to provide a uniform retaining pressure over the end 21 of the friction cup 18.

As best shown in Figure 1, the wheels 23 and 24 are mounted on a shaft 28 projecting outwardly from a carriage 29 so as to overlie the table 12 and straddle the blade 14. The shaft 28 is supported on spaced bearings 31 mounted on the carriage 29. The wheel 24 abuts against a collar 32 mounted on the shaft 28 and is held in spaced relation with the wheel 23 by a spacer 33 disposed between the wheels. The spacer 33 spaces the wheels 23 and 24 apart sufficiently so that the wheels straddle the saw blade 14 without effecting a binding of the respective parts as the blade 14 and wheels 23 and 24 rotate. A nut 34 screwed on the end of the shaft 28 and abutting against a washer 36 which in turn abuts against the wheel 23 maintains the wheels 23 and 24 and the spacer 33 in a rigidly assembled relation on the end of the shaft 28. It is to be understood that any suitable means well known in the art may be used to key the wheels 23 and 24 to the shaft 28 so that the wheels rotate in unison with the shaft. A guard 30 secured to the carriage 29 overlies the wheels 23 and 24 to prevent accidental contact with the wheels and the friction cups 18.

Provision is made for driving the shaft 28 at preselected speeds so that as the suction cups 18 rotate the bottom cups frictionally engage the panel 13 and feed the latter to the saw blade 14 at a speed coordinated with the speed of the saw blade, determined by the type of wood being sawed. As best shown in Figure 1 the shaft 28 is driven through a speed reduction unit 37 by a motor 38. As shown in Figure 1 the speed reduction unit 37 and the motor 38 are mounted in a chamber 39 formed on the interior of the carriage 29. Access to the chamber may be had through a door 41 mounted on the side of the carriage 29. While the motor 38 is shown as being connected to the speed reduction unit 37 by a V-belt connection 42 and the motor 38 and the speed reduction unit 37 are provided with three stepped pulleys for obtaining different operating speeds of the shaft it is to be understood that any other connection between the motor and the speed reduction unit well known in the art may be utilized.

Means is provided for supporting the wheels 23 and 24 so that the position of the cups 18 relative to the saw blade 14 and table 12 may be adjusted both in a horizontal and a vertical direction as seen in Figure 1 to insure proper positioning of the parts to effect feeding at the panel across the table 12 to the blade 14. As shown the carriage 29 is slidably mounted on a beam 44, as by having the carriage formed with a circular opening 45 for receiving the beam, projecting outwardly from a sleeve or collar 46, in turn slidably mounted on an upright column 47. To guide the carriage 29 in its axial movement the ends of lock screws 48 fit in an axially extending keyway 49 formed on the upper surface of the beam 44 as shown in Figure 1. When the lock screws are loosened the carriage is freely movable and when the lock screws are tightened they secure the carriage 29 in a desired adjusted position relative to the beam 44. Thus, by moving the carriage 29 axially of the beam the wheels 23 and 24 may be moved axially of the saw blade 14 as required for a particular feeding operation. The collar 46 is mounted for vertical sliding movement relative to the column 47. To this end a screw 51 extends axially through the collar 46 adjacent the column 47 and abuts against an abutment 52 in the form of a ring or collar secured to the column 47 as by set screws 45 below the collar 46. This construction permits of radial positioning of the beam 44 as well as providing means for supporting the beam. The upper end of the screw 51 is squared as for the reception of a crank or the like, not shown. Rotation of the screw effects axial movement of the collar 46 and the beam 44 relative to the column 47 and in turn the distance from the table 12 to the shaft 28 and friction members or cups 18 thereby making it possible to use the feed mechanism for panels of different thicknesses and to insure that the bottom cups are compressed slightly to effect a positive engagement with the panel. The collar 46 is guided in its axial movement relative to the column 47 by engagement of the ends of lock screws 53 in an axially extending keyway 54 formed at one side of the column 47. It is to be understood that by turning the lock screws 53 until the extreme ends of the lock screws engage the bottom of the keyway 54 the collar 46 can be positively secured in any desired position. Where desired a plurality of annularly spaced axially extending keyways 54 may be provided so that the beam 44 may be secured in any radial position relative to the column 47. It is to be understood also that where desired the axial extending slots 54 may be omitted, in which case the lock screws 53 will abut against the exterior surface of the column 47. The latter construction is advantageous in that it permits the beam to be secured in any radial position. At its lower end the column 47 is secured to a suitable base 56 as by a flange 58, rigid with the lower end of the column 47, being bolted to the base. It is to be understood that the base 56 may be a part of the saw 11 or it may be a separate member located at one side of the saw.

The operation of the feed mechanism is readily apparent from the aforegoing description but may be briefly summarized as follows. It is assumed that the wheels 23 and 24 have been adjusted relative to the saw blade 14 so that the wheels straddle the blade and the friction cups 18 are spaced from the table 12 a sufficient distance so that they can feed a panel of the desired thickness to the saw blade 14. When in the proper position, the cups should be compressed slightly. The guide 16 is also adjusted as required for cutting the panels to the desired width. The motor 38 is started and drives the shaft 28 at a preselected speed. The panel 13 is then placed on the table so that one edge engages the guide 16. The panel 13 is pushed forward across the table 12 until the resilient cups 18 engage the top surface of the panel. As soon as the resilient cups 18 on the bottom of the wheels engage the panel the operator may remove his hands from the panel since the rotation of the wheels 23 and 24 causes the successive cups to grip the panel and feed it to the saw blade 14.

I claim:

1. In a mechanism for feeding a piece of lumber or the like along a predetermined path across a table to a saw blade, the combination of a plurality of annularly spaced resilient friction members disposed on opposite sides of the blade and each having an annular friction surface, spaced wheels for supporting said friction members and rotatable about an axis overlying said table, means for attaching said friction members to said wheels with the annular friction surfaces facing radially outwardly from said axis, means for supporting said wheels relative to the table whereby the friction members adjacent the table are urged into engagement with the piece of lumber and are compressed when so engaging the lumber, and means for rotating said wheels at a predetermined speed whereby the annular surfaces on said friction members successively frictionally engage said piece of lumber and feed the latter to the saw blade.

2. In a mechanism for feeding a piece of lumber or the like across a table to a saw blade, the combination of a plurality of annularly spaced resilient cups disposed on at least one side of said saw blade and each having an annular friction surface of substantial area disposed in a common plane, means for mounting said cups for rotation about an axis overlying said table and with said annular friction surfaces facing radially outwardly from said axis, means for supporting said latter means whereby the annular friction surfaces of said cups adjacent the table are compressed upon engagement with the piece of lumber, and variable speed means for rotating said cups whereby said annular friction surfaces successively frictionally engage the piece of lumber and feed it along a predetermined path to the saw blade.

3. In a mechanism for feeding a piece of lumber or the like across a table to a saw blade, the combination of a plurality of annularly spaced radially extending resilient cups on opposite sides of said saw blade and each having an open and a closed end, spaced wheels, means for mounting the closed ends of said cups on said wheels with the open ends facing radially outwardly to define annularly spaced annular friction surfaces of substantial area each defining a planar face, a shaft supporting said wheels and rotatable about an axis to effect successive engagement of the friction surfaces with the piece of lumber, means supporting said shaft whereby the annular surfaces on the bottom cups on each wheel are urged into frictional engagement with the piece of lumber on opposite sides of the saw blade and are compressed upon such engagement with the lumber, said last-mentioned means comprising a vertical column shaped to be disposed adjacent the table and a beam mounted on said column for vertical adjustment and shaped to overlie said table, and means for driving said shaft comprising a motor supported by said beam, a variable speed reducing unit supported by said beam and means interconnecting said motor and said speed reducing unit whereby to effect successive engagement of the annular friction surfaces with the piece of lumber to feed the latter to the saw blade.

4. In a mechanism for feeding a panel or the like across a table to a saw blade, the combination of spaced wheels on opposite sides of the saw blade and rotatable about an axis overlying said table, each wheel having a smooth cylindrical rim, a plurality of friction cups spaced about the rim, each having a mounting portion and an annular portion projecting outwardly from the mounting portion, clamping means engageable with a substantial portion of said mounting portion for securing said friction cups against the rim with the annular portion extending radially outwardly from the wheel, the open ends of said cups defining annular friction surfaces of substantial area each defining a planar panel-engaging face, means supporting said wheels in a position relative to the table to urge the annular friction surfaces adjacent the table into frictional engagement with the panel and to compress the cups during such engagement thereof with the panel, and means for rotating said wheels to move said annular surfaces on said friction members successively into engagement with said panel to feed the latter to the saw blade.

5. In a mechanism for feeding a piece of lumber or the like across a table to a saw blade, the combination of a plurality of annularly spaced resilient cups disposed on opposite sides of said saw blade and each having an outer annular friction surface of substantial area disposed in a common plane, mounting means supporting said cups for rotation about an axis overlying said table and with said annular surfaces facing outwardly from said axis, said mounting means being operative to position the annular friction surfaces of the cups in frictional engagement with the piece of lumber and to compress the cups during such engagement thereof with the piece of lumber, and drive means for rotating said cups about said axis to move the cups successively into frictional engagement with the piece of lumber to feed the latter along a predetermined path to the saw blade.

GEORGE O. ARVIDSON.

REFERENCES CITED

The following references are of record in the file of this patent:

UNITED STATES PATENTS

| Number | Name | Date |
|---|---|---|
| 355,011 | Gray | Dec. 28, 1886 |
| 395,719 | Snedeker | Jan. 8, 1889 |
| 803,972 | Bechman | Nov. 7, 1905 |
| 1,109,747 | Giertsen | Sept. 8, 1914 |
| 1,528,535 | De Walt | Mar. 3, 1925 |
| 1,603,763 | Griffin | Oct. 19, 1926 |
| 1,634,196 | Jones | June 28, 1927 |
| 1,957,621 | Styron | May 8, 1934 |
| 1,961,401 | Steinmann | June 5, 1934 |
| 2,229,398 | Thompson | Jan. 21, 1941 |

FOREIGN PATENTS

| Number | Country | Date |
|---|---|---|
| 139,888 | Switzerland | July 16, 1930 |
| 244,400 | Switzerland | Apr. 1, 1947 |